United States Patent
Winzell et al.

(10) Patent No.: US 12,462,352 B2
(45) Date of Patent: Nov. 4, 2025

(54) METHOD FOR THERMAL IMAGE PROCESSING

(71) Applicant: Axis AB, Lund (SE)

(72) Inventors: Thomas Winzell, Lund (SE); Lidia Gridneva, Lund (SE); Jimmy Heimdal, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 18/749,910

(22) Filed: Jun. 21, 2024

(65) Prior Publication Data

US 2024/0428382 A1     Dec. 26, 2024

(30) Foreign Application Priority Data

Jun. 26, 2023   (EP) ..................................... 23181427

(51) Int. Cl.
*G06T 5/70*     (2024.01)
*G06T 5/40*     (2006.01)
*G06T 7/73*     (2017.01)

(52) U.S. Cl.
CPC .................. *G06T 5/70* (2024.01); *G06T 5/40* (2013.01); *G06T 7/73* (2017.01); *G06T 2207/10048* (2013.01)

(58) Field of Classification Search
CPC .... G06T 5/70; G06T 5/40; G06T 7/73; G06T 2207/10048; G06T 5/90; G06T 5/50;
(Continued)

(56) References Cited

U.S. PATENT DOCUMENTS

| 6,690,011 B2 | 2/2004 | Watanabe et al. |
| 2003/0086624 A1 | 5/2003 | Garcia |
| 2010/0245608 A1 | 9/2010 | Trudeau et al. |
| 2013/0120614 A1 | 5/2013 | Oyama |

(Continued)

FOREIGN PATENT DOCUMENTS

| CN | 108898567 A | * 11/2018 | ............... G06T 5/70 |
| CN | 113379636 A | * 9/2021 | ............... G06T 7/90 |

(Continued)

OTHER PUBLICATIONS

Extended European Search Report issued on Dec. 4, 2023 for European Patent Application No. 23181427.8.

*Primary Examiner* — Jose L Couso
(74) *Attorney, Agent, or Firm* — Volpe Koenig

(57) ABSTRACT

A method for thermal image processing, comprises: acquiring a thermal image depicting a scene; obtaining a frequency distribution based on pixel intensities of the thermal image; processing the frequency distribution to determine whether the frequency distribution comprises a peak, caused by a hot object in the scene, which is separated from a thermal background of the scene by more than an intensity threshold; and in response to determining that the frequency distribution comprises the peak, processing the thermal image to suppress a ghost image of the hot object in the thermal image, wherein the ghost image is caused by internal reflections of radiation from the hot object in the thermal camera, and wherein the processing of the thermal image comprises: estimating a location of ghost image pixels forming the ghost image; and suppressing the ghost image in the thermal image by adjusting intensities of the ghost image pixels.

20 Claims, 6 Drawing Sheets

(58) Field of Classification Search
CPC ............. G06T 7/70; G06T 2207/20224; G06T 7/33; G06T 2207/10012; G06T 2207/10016; G06T 2207/10028; G06T 7/136; G06T 7/11; G06T 7/593; G06T 7/80; G06T 5/73; G06T 5/77; G06T 2207/20192; G06T 2207/20208; G06T 2207/20221; H04N 25/21; H04N 25/61; H04N 23/81; H04N 23/20; H04N 23/23; H04N 1/4074; H04N 23/71; H04N 23/741; H04N 25/615; G01J 5/48; G06V 10/42; G06V 20/58; G06V 10/141; G06V 10/145; G06V 10/60; G02B 27/0018; G02B 13/22

See application file for complete search history.

(56) References Cited

U.S. PATENT DOCUMENTS

| | | | |
|---|---|---|---|
| 2014/0184805 A1* | 7/2014 | Schmidt | H04N 23/23 348/164 |
| 2019/0235239 A1* | 8/2019 | Kim | G02B 27/0101 |
| 2022/0326514 A1 | 10/2022 | Fitzgerald et al. | |
| 2023/0196514 A1* | 6/2023 | Salini | G06T 5/77 382/168 |

FOREIGN PATENT DOCUMENTS

| | | | | |
|---|---|---|---|---|
| CN | 114266710 A | | 4/2022 | |
| CN | 114972077 A | * | 8/2022 | ............... G06T 5/90 |
| EP | 2753071 A2 | | 7/2014 | |
| EP | 4138030 A1 | | 2/2023 | |

\* cited by examiner

METHOD FOR THERMAL IMAGE PROCESSING

TECHNICAL FIELD

The present invention generally relates to a method for thermal image processing and a corresponding thermal camera.

BACKGROUND

Thermal cameras are used in various monitoring applications and enable thermal imaging of a scene as well as remote temperature measurements. In some installations, a thermal camera is used to monitor temperature for early fire detection and/or detecting over-heating of objects. When capturing a thermal image of a scene comprising a hot object, radiation received from the hot object may due to internal reflections in the thermal camera result in an image artefact in the form of a ghost image of the hot object. Notably, reflections may occur between the front cover glass and the thermal image sensor of the thermal camera. Such reflections of the hot object may result in a ghost image being both sharp and well-focused. The ghost image may thus be quite difficult to distinguish from an actual hot object, both for an operator and for many types of automatic image processing-based analytics. The ghost image may also obscure other objects of interest within the scene.

One conventional technique for reducing internal reflections is to provide optical elements of the thermal imaging system with antireflective coatings. However, an antireflective coating may have limited effectiveness in suppressing the strong reflections caused by hot objects. The sensitivity of the thermal camera in the wavelength range of the antireflective coating is also reduced. US 2022/0326514 A1 discloses a further technique for reducing undesired reflections using a curved protective window or a filter to defocus or attenuate reflected radiation. However, these approaches involve the addition of specifically adapted optical elements to the thermal camera, which may complicate manufacture and result in increased costs. A further drawback is that introduction of additional optical elements in the imaging system may impact all radiation received by the thermal camera and thus degrade the image quality, also in situations when there is no risk for appearance of a ghost image.

SUMMARY

It is an object of the present invention to provide a method for suppressing a ghost image of a hot object in a thermal image which does not require addition of any specifically adapted optical elements, and which further is adaptable to the thermal dynamics of a monitored scene. Further and alternative objectives may be understood from the following.

According to a first aspect of the present invention, there is provided a method for thermal image processing, the method comprising:

obtaining a thermal image acquired by a thermal camera and depicting a scene;

obtaining a frequency distribution based on pixel intensities of the thermal image;

processing the frequency distribution to determine whether the frequency distribution comprises a peak, caused by a hot object in the scene, which is separated from a thermal background of the scene by more than an intensity threshold; and in response to determining that the frequency distribution comprises the peak which is separated from the thermal background by more than the intensity threshold, processing the thermal image to suppress a ghost image of the hot object in the thermal image, wherein the ghost image is caused by internal reflections of radiation from the hot object in the thermal camera, and wherein the processing of the thermal image comprises:

estimating a location of ghost image pixels forming the ghost image; and suppressing the ghost image in the thermal image by adjusting intensities of the ghost image pixels.

Thus, the method of the first aspect enables a selective or conditional suppression of a ghost image based on whether a peak caused by the radiation from the hot object (hereinafter "hot object peak") is present in the frequency distribution and is separated from the thermal background (i.e. the thermal background radiation) of the scene by more than an intensity threshold (which may be referred to as the "ghost image suppression threshold"). The present invention is hence at least partly based on the insight that the relative temperature of the hot object and the thermal background may be used as a reliable predictor of whether any appreciable ghost image is present in the thermal image or not. In absence of a hot object peak separated from the thermal background by more than the intensity threshold, the temperature difference within the scene is determined to be too small to motivate subjecting the thermal image to ghost image suppression. Hence, if it is determined that the frequency distribution does not comprise a hot object peak with a separation above the thermal background exceeding the intensity threshold, it may be determined that the ghost image suppression need not be performed on the thermal image.

In a case where the scene comprises a hot object with a relatively small temperature difference compared to the thermal background, the frequency distribution may still present a hot object peak, however separated from the thermal background by less than the intensity threshold. Although the hot object in this case still may give rise to a ghost image, the additional intensity added to the ghost image pixels due to the hot object may be too small to risk causing confusion for automatic image processing algorithms processing the thermal image or for an operator viewing the thermal image.

Accordingly, in responsive to determining that the frequency distribution comprises a hot object peak separated from the thermal background by more than the intensity threshold, the thermal image is subjected to ghost image suppression to generate a processed thermal image. Otherwise, it may be determined that the thermal image is not to be subjected to ghost image suppression. In the first case, the ghost image suppression may generate a processed thermal image, which e.g. may be forwarded to a downstream image processing pipeline for further image processing. In the second case, the thermal image may be forwarded to the downstream image processing pipeline without subjecting the thermal image to the ghost image suppression.

This means that, in a scenario wherein the scene comprises a hot object causing a hot object peak separated from the thermal background by more than the intensity threshold, the method comprises:

obtaining a thermal image acquired by a thermal camera and depicting a scene comprising a hot object;

obtaining a frequency distribution based on pixel intensities of the thermal image;

processing the frequency distribution to determine that the frequency distribution comprises a peak which is separated from a thermal background of the scene by more than an intensity threshold, wherein the peak is caused by the hot object; and in response to determining that the frequency distribution comprises the peak which is separated from the thermal background by more than the intensity threshold, processing the thermal image to suppress a ghost image of the hot object in the thermal image, wherein the ghost image is caused by internal reflections of radiation from the hot object in the thermal camera, and wherein the processing of the thermal image comprises:

estimating a location of ghost image pixels forming the ghost image; and suppressing the ghost image in the thermal image by adjusting intensities of the ghost image pixels.

Conversely, in a scenario wherein the scene does not comprise a hot object causing a hot object peak separated from the thermal background by more than the intensity threshold, the method comprises:

obtaining a thermal image acquired by a thermal camera and depicting a scene;

obtaining a frequency distribution based on pixel intensities of the thermal image;

processing the frequency distribution to determine that the frequency distribution does not comprise a peak which is separated from a thermal background of the scene by more than an intensity threshold; and in response to determining that the frequency distribution does not comprise a peak which is separated from the thermal background by more than the intensity threshold, determining to not perform any ghost image suppression on the thermal image (e.g. forwarding the thermal image (as obtained) to a downstream image processing pipeline without subjecting the thermal image to ghost image suppression).

By subjecting the thermal image to ghost image suppression in response to determining that the frequency distribution comprises a hot object peak which is separated from the thermal background by more than the intensity threshold, a visually improved thermal image may be obtained which better reflects the actual distribution of temperature. Suppressing the ghost image may further reduce the risk of false alarms due to the ghost image being interpreted as a hot object at a location in the scene where an elevated temperature is not expected. Additionally, the risk of the ghost image confusing automatic monitoring algorithms based on image analysis, such as object tracking, may be reduced.

The frequency distribution- and pixel-based processing of the method provides a reliable and computationally efficient way of determining whether to perform ghost image suppression without resorting to object detection algorithms. Rather, the method may be implemented using simple arithmetic which lends itself favorably for computationally efficient implementations in a processing device (such as an FPGA) of a thermal image processing system.

Once the need for ghost image suppression has been detected based on the threshold comparison, the location of the ghost image may be estimated wherein the ghost image may be suppressed by adjusting the intensities of the ghost image pixels. Various embodiments for adjusting the pixel intensities will be set out in the following. However, in general, the adjustment may comprise reducing the intensities (values) of the ghost image pixels in dependence on the intensities of the pixels depicting the hot object (i.e. the "hot object pixels").

By "hot object" is here meant an object (i.e. a physical object) with a temperature which is elevated relative the thermal background of the scene. The hot object may in particular refer to an object with a radiance exceeding a radiance of the thermal background (i.e. towards the thermal camera).

By "pixel intensity" (interchangeably "pixel value") is here meant an intensity (or value) of a pixel in a thermal image. For a thermal image, the intensity of a pixel reflects the radiance received from the scene at the pixel. The intensity is hence proportional to temperature. The intensity may also be interpreted as the amount or IR radiation, or the radiant flux received from the scene at the pixel.

By "frequency distribution based on pixel intensities" is here meant a statistical distribution indicative of the number of times different pixel intensities (or pixel values) occur in the thermal image. The frequency distribution may thus be indicative of a frequency distribution of radiance or temperature in the scene. The frequency distribution may also be referred to as a histogram. The frequency distribution may indicate either an absolute frequency or a relative frequency of the pixel intensities. The frequency distribution may be "binned", i.e. the frequency may be indicated for a number of bins (i.e. classes or sub-ranges) of pixel intensities defined over the range of pixel intensities, as this may reduce the computational resources required by the method.

By "peak in the frequency distribution" is here meant a pixel intensity, or an interval of at least a predefined number of consecutive pixel intensities (e.g. one or more bins or sub-ranges of the frequency distribution), for which the frequency exceeds a predefined minimum frequency.

In some embodiments, processing the frequency distribution comprises: detecting in the frequency distribution the peak (first peak) caused by the hot object and a further peak (second peak) caused by a thermal background of the scene, and determining whether a separation between the first peak and the second peak exceeds the intensity threshold.

The background radiation in the scene will typically be confined to some interval within the frequency distribution (the absolute position being dependent on the absolute temperature) and hence, like the hot object, give rise to a second peak in the frequency distribution (hereinafter "background peak"). Comparing the separation of the hot object peak (first peak) and the background peak (second peak) to the intensity threshold hence provides a convenient and computationally efficient way of determining whether to perform the ghost image suppression. It is here noted that the terms "first" and "second" merely are labels introduced to facilitate reference to the respective peaks and do not indicate any order or significance of the peaks. Indeed, the first peak (hot object peak) will be found at higher pixel intensities than the further/second peak (background peak).

In some embodiments, the thermal image comprises raw thermal image data and the frequency distribution is a frequency distribution of pixel intensities of the raw thermal image data. The frequency distribution may thus represent the pixel intensities prior to non-linearization of the raw thermal image data. Non-linearization of the raw thermal image data (interchangeably "raw signal") captured from the thermal image sensor may produce transformed image data with a compressed dynamic range more suitable for viewing by a human and less resource intensive to process further down in the image processing chain. However, a side effect of the non-linearization is a changed distribution of pixel intensities. The relationship between a hot object peak and a thermal background in a frequency distribution computed from non-linearized image data may thus deviate from the actual relative temperatures within the scene. Accordingly, by processing a frequency distribution of pixel intensities of the raw thermal image data, the ghost image detection may be performed early in the processing chain, prior to introducing such distortion in the thermal data. The method may comprise receiving the thermal image comprising the raw thermal image data from the thermal camera, and computing the frequency distribution from the pixel intensities of the raw thermal image data.

In some embodiments, the method further comprises: obtaining a noise level estimate for the thermal camera; and determining the intensity threshold based on the noise level estimate. The noise level of the thermal camera sets a lower bound below which the ghost image may not be distinguished from the thermal background. The noise level for the thermal camera hence represents a conservative basis for determining the intensity/ghost image suppression threshold.

In some embodiments, the noise level estimate for the thermal camera is derived from a noise threshold of a noise filter of the thermal camera or estimated based on a set of auxiliary thermal images of the scene acquired by the thermal camera. The intensity threshold may thus be set dynamically, during a thermal monitoring process, and hence adapt the threshold to the actual conditions in the scene. The intensity threshold may in particular be determined based on the noise level estimate and an estimated average pixel intensity for the scene, such as based on a ratio of the noise level estimate and the estimated average pixel intensity.

In some embodiments, the intensity threshold is a predetermined intensity threshold (i.e. the value of the intensity threshold is predetermined). The intensity threshold may for instance be set to correspond to a temperature difference between the hot object and the thermal background above which a strong ghost image is known or expected to appear.

In some embodiments, the method further comprises estimating a location of hot object pixels depicting the hot object in the thermal image by identifying pixels in the thermal image corresponding to the peak in the frequency distribution caused by the hot object;
wherein the location of the ghost image pixels in the thermal image is estimated based on the estimated location of the hot object pixels.

Having identified the hot object peak, the hot object pixels in the thermal image causing the hot object peak may be identified as pixels with an intensity corresponding to the peak (e.g. falling within the peak). Knowing the imaging properties of the thermal camera (e.g. obtained by characterizing the thermal camera prior to deployment) the location where the ghost image pixels are expected to appear may be estimated from the location of the hot object pixels. The hot object pixels (are estimated to) depict the hot object and thus form a hot object image. The hot object pixels may hence interchangeably be referred to as the pixels of the (estimated) hot object image.

In some embodiments, the hot object pixels are pixels in the thermal image belonging to a contiguous set of at least a threshold number of pixels and having an intensity falling within the peak in the frequency distribution caused by the hot object. Thereby, the location estimation may be made less sensitive to occurrences of single pixels or small clusters of pixels with an intensity within the hot object peak which either are too small to motivate suppression, or are not caused by a hot object.

In some embodiments, the location of the ghost image pixels is estimated using a predefined transform mapping the location of the hot object pixels to an estimated location of the ghost image pixels. The mapping may be based on, or represent, the imaging properties of the optical system of the thermal camera. Estimating the location of the ghost image using a predetermined transform function enables a computationally efficient implementation, avoiding the need for more complex image analysis and data fitting approaches.

In some embodiments, the mapping is such that the ghost image pixels correspond to point reflections of the hot object pixels. That is, the location of the ghost image in the thermal image may be estimated by inverting the estimated location of the hot object pixels with respect to a point in the thermal image. This type of transform function enables the location of the ghost image to be found when the ghost image is due to internal reflections involving the thermal image sensor. Reflections from the thermal image sensor itself may be a major contributor to a ghost image and tend to result in a ghost image in the form of a well-focused inverted image (i.e. a mirror image) of the hot object (albeit with a reduced intensity). By defining the mapping such that the ghost image pixels correspond to point reflections of the hot object pixels relative a center pixel of the thermal image, reliable estimation of the location of the ghost image pixels in a large number of scenarios may be achieved.

In some embodiments, estimating the location of the hot object pixels comprises determining a pixel coordinate of each hot object pixel, and wherein estimating the location of the ghost image pixels comprises mapping the pixel coordinate of each hot object pixel to a pixel coordinate of a corresponding ghost image pixel using the predefined transform. Each hot object pixel may thus be mapped or related to a spatially corresponding ghost image pixel.

In some embodiments, estimating the location of the hot object pixels comprises determining pixel coordinates of an enclosure for the hot object pixels, and
wherein estimating the location of the ghost image pixels comprises mapping the pixel coordinates of the enclosure for the hot object pixels to corresponding pixel coordinates for an enclosure for the ghost image pixels using the predefined transform, wherein the ghost image pixels are the pixels located within the determined enclosure for the ghost image pixels.

By this approach, the location of the ghost image pixels may be estimated by mapping an enclosure of the hot object pixels using the predefined transform (e.g. such that the pixel coordinates of the enclosure of the hot object pixels are mapped by point reflection to coordinates of the enclosure of the ghost image pixels). Due to involving fewer computations, this may enable a computationally more efficient estimation of the location of the ghost image pixels than an express mapping of each individual hot object pixel.

In some embodiments, suppressing the ghost image in the thermal image comprises adjusting the intensity of the ghost image pixels by subtracting a fraction of a hot object pixel intensity. The additional intensity added to the ghost image pixels, due to the internal reflections of the hot object, may thus be subtracted. Advantageously, in embodiments wherein the thermal image comprises raw thermal image data, the suppression may be applied to the intensities of the ghost image pixels in the raw thermal image data.

In some embodiments, the fraction is a predetermined value. This enables a simple and computationally efficient implementation of the ghost image suppression. The suppression may still be effective, as it may be expected that the intensity of each ghost pixel may be attenuated to a same degree, regardless of the intensity of its corresponding hot object pixel.

In some embodiments, the hot object pixel intensity is an intensity falling within the peak caused by the hot object. As the intensities of the peak reflect the intensities of the hot object pixels, this enables an effective ghost image suppression.

In some embodiments, a fraction of a representative hot object pixel intensity is subtracted from each ghost image pixel. Thereby, the intensity of each ghost image pixel may be attenuated by a same amount. This enables a computationally efficient implementation of the ghost image suppression.

In some embodiments, the representative hot object pixel intensity corresponds to an average, a median or a highest frequency intensity of the peak caused by the hot object. These metrics all represent useful single-value representations of the hot object pixel intensity.

In some embodiments, a fraction of a hot object pixel intensity of a respective spatially corresponding hot object pixel is subtracted from each ghost image pixel. Thereby, the amount of intensity attenuation applied to each ghost image pixel may be tailored in accordance with the intensity of its spatially corresponding hot image pixel. This may allow an effective ghost image suppression even in a case of a comparably wide hot object peak (corresponding to a spatially varying temperature of the hot object). These embodiments may advantageously be used in combination with embodiments comprising determining a pixel coordinate of each hot object pixel, wherein the location of the ghost image pixels is estimated by mapping the pixel coordinate of each hot object pixel to a pixel coordinate of a corresponding ghost image pixel using the predefined transform, wherein a one-to-one mapping between hot object pixel and ghost image pixel may be established. In this case, a "spatially corresponding hot object pixel" of a respective ghost image pixel may refer to the hot image pixel mapped to the ghost image pixel.

According to a second aspect, there is provided a method for thermal imaging, comprising:
    acquiring by a thermal camera a thermal image of a scene; and
    processing the thermal image using the method according to the first aspect or any of the embodiments thereof.

According to a third aspect, there is provided a computer program product comprising computer program code portions configured to perform the method according to the first aspect or any of the embodiments thereof, when executed by a processing device.

According to a fourth aspect, there is provided a thermal camera comprising a processing device configured to perform the method according to the first aspect or any of the embodiments thereof.

The second, third and fourth aspects feature the same or equivalent benefits as the invention according to the first aspect. Any functions described in relation to the first aspect, may have corresponding features in a system and vice versa.

BRIEF DESCRIPTION OF THE DRAWINGS

This and other aspects of the present invention will now be described in more detail, with reference to the appended drawings showing embodiments of the present invention.

DETAILED DESCRIPTION

Figure 1:
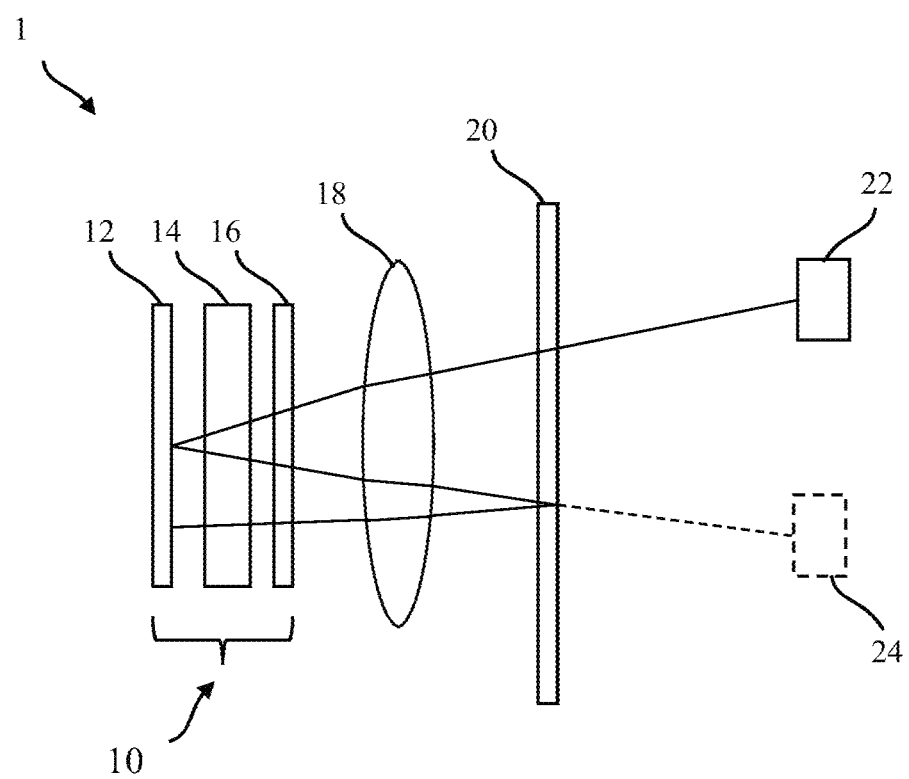
FIG. 1 is a schematic depiction of an implementation of a thermal camera.

FIG. 1 schematically shows an example implementation of a thermal camera 1. The thermal camera 1 comprises a thermal image sensor 14. The thermal image sensor 14 may be of a conventional type, such as a microbolometer sensor. A microbolometer sensor may efficiently detect IR radiation in a range of about 7-14 µm. Microbolometer sensors are commercially available in various resolutions, such as 160× 120 pixels, 1024×1024 pixels and greater. In the illustrated example, the image sensor 14 forms part of a sensor package 10 further comprising a reflector 12 arranged behind the image sensor 14 and a sensor window 16 arranged in front of the image sensor 14. The reflector 12 may boost the effective fill factor of the image sensor 14 and may for example be a λ/4 reflector of Au. The sensor package 10 may in some implementations be a vacuum package, wherein the window 16 (which e.g. may be formed of Si) may be arranged as a vacuum seal of the sensor package 10.

The thermal camera 1 further comprises an optical system 18 and a cover 20. In FIG. 1 the optical system 18 is for simplicity shown as a single lens but may in general comprise a number of beamforming optical elements such as lenses and optical filters. The cover 20 is formed of a material transparent to IR radiation in the wavelength range of interest. One example material for the cover 20 is Ge. The optical elements as well as the cover 20 may further be provided with an anti-reflection (AR) coating to reduce internal reflections within the thermal camera 1. One example of a conventional AR coating is Diamond-Like-Coating (DLC). However, internal reflections will still occur in the thermal camera 1. Typical sources of strong internal reflections include between the cover 20 and the reflector 12 and/or the image sensor 14 and/or the window 16. If IR radiation of a sufficient intensity is received by the thermal camera 1, these internal reflections may give rise to ghosting in a thermal image acquired by the thermal camera 1. This is schematically illustrated in FIG. 1, wherein reference sign 22 indicates a hot object in a scene and reference sign 24 indicates a virtual ghost image 24 of the hot object 22 caused by internal reflections of the radiation from the hot object 22, in this example between the reflector 12 and the cover 20. For reflections between the reflector 12 and the cover 20, as in FIG. 1, the ghost image 24 will be formed as an attenuated and well-focused inverted image of the hot object 22, typically relative a center pixel of the thermal image (as the relevant reflecting surfaces typically are parallel in current thermal cameras). This applies also for reflections between the cover 20 and the image sensor 14 and between the cover 20 and the window 16. The reflector 12, the image sensor 14 and the window 16 will in general have a very small separation (several orders of magnitude smaller than the distance to the cover 20). For the purpose of the following discussion, it does therefore not matter which of these elements 12, 14, 16 is/are contributing to the ghost image formation. That is, internal reflections between the cover 20 and the surfaces of each of the elements 14, 16, 20 in practice tends to contribute to a same ghost image.

Figure 2A:
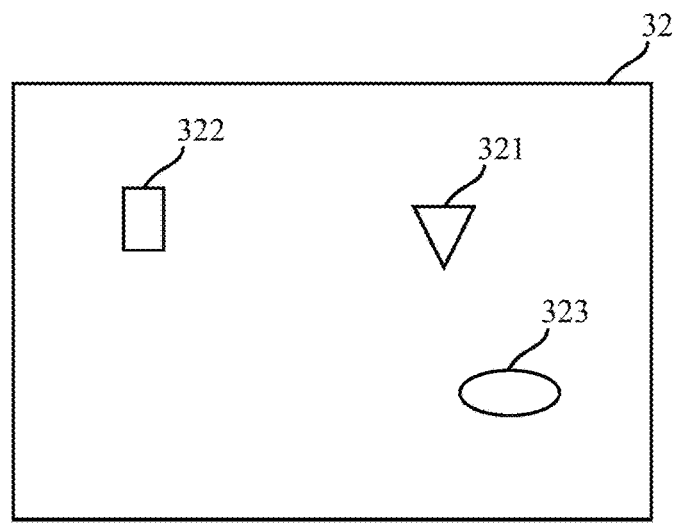
FIG. 2*a-c* schematically show thermal images of a scene when there is no hot object in the scene and when a hot object is present in the scene, respectively.
Figure 2B:
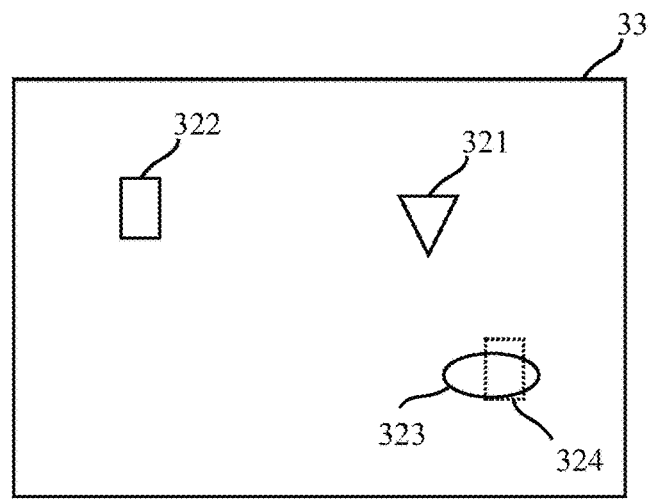
Figure 2C:
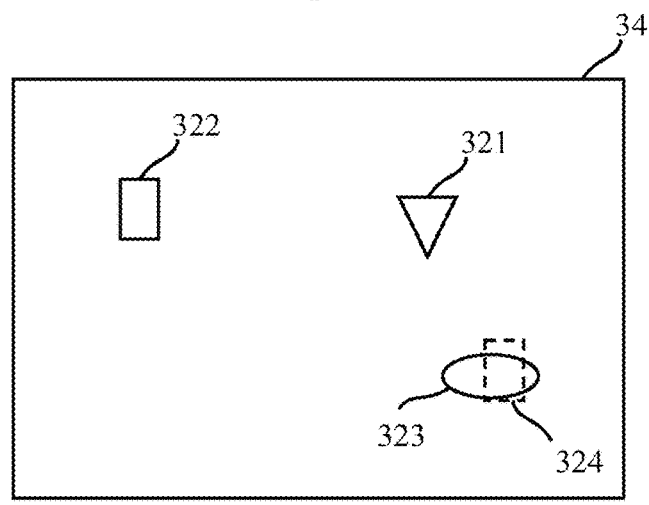

FIG. 2a-c schematically show thermal images 32, 33 and 34 acquired from a scene by a thermal camera, such as the thermal camera 1. The thermal images 32-34 depict a same scene and comprise a number of physical objects 321, 322, 323, for simplicity shown as respective basic geometrical shapes. As may be appreciated, the type, shape and number of objects in a scene will vary in dependence on the particular monitoring application and on the environment in which the thermal camera is installed. For instance, a thermal camera may be installed in an interior environment (such as in a residential, commercial or public building) or in an outdoor environment (such as in a parking lot, at a street or crossing, in a park, at a field, or at a forest), to allow manual or automatic thermal imaging of objects occurring in the environment. One non-limiting example application is thermal imaging for early fire detection (manual or automatic). Another non-limiting example is thermal imaging of a metallurgical or chemical process involving a heating or thermal treatment step e.g. conducted in an oven wherein oven doors may alternatingly be open or closed, or wherein the view may occasionally be blocked by a cold object. Yet another non-limiting example is monitoring a scene at an oil refinery where outlet flames may appear and result in ghost images in the thermal images. Yet another non-limiting example is monitoring heat generating components of an engine or motor, such as at a power station.

Figure 3A:
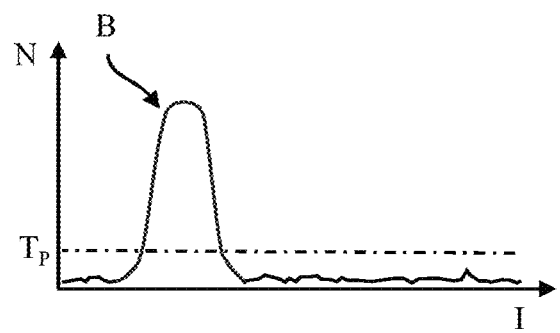
FIG. 3*a-c* schematically show example frequency distributions of thermal images captured for different scene conditions.

The thermal image 32 in FIG. 2a depicts the scene when none of the objects 321-323 qualify as "hot objects", and thus have substantially the same temperature as the thermal background. In other words, the objects 321-323 (or more precisely the IR radiation received from the objects 321-323) form part of the thermal background. FIG. 3a shows an example of a frequency distribution or histogram of the pixel intensities of the thermal image 32 in FIG. 2a, where N denotes the number of pixels (in absolute or relative numbers) with intensity I. The horizontal axis may equivalently, in case of a thermographic calibrated camera, be in units of radiance (W·sr−1·m−1) or temperature (° C. or K). As shown, the frequency distribution in this case comprises only a single peak B caused by the thermal background (interchangeably "second peak" or "background peak"). The width of the peak B is proportional to the variation of intensities (or radiance or temperature) of the thermal background. For illustrational clarity, the background peak B is depicted with a simple and regular shape. It is however to be noted that the specific shape of the background peak B may vary depending on the specific distribution and spread of temperatures of the thermal background, and thus may present a more irregular shape. This applies correspondingly to the further peaks discussed below.

Figure 3B:
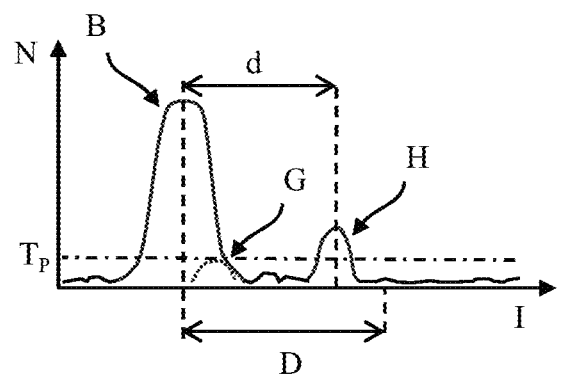

The thermal image 33 in FIG. 2b, depicts the scene when the temperature of the object 322 is increased above the thermal background (by way of example, the hot object 322 may be about 5-20 K hotter than the thermal background). A greater amount of IR radiation (greater radiant flux) is thus received by the pixels imaging the object 322 than the pixels imaging the thermal background (comprising the objects 321, 323). FIG. 3b shows an example of the corresponding frequency distribution of pixel intensities for the thermal image 33. The frequency distribution comprises a peak H caused by the hot object 322 (interchangeably "first peak" or "hot object peak"), in addition to the background/second peak B caused by the thermal background. The temperature difference between the hot object 322 and the thermal background translates to a separation d between the background peak B and the hot object peak H. As discussed above, internal reflections in the thermal camera (e.g. between the cover 20 and the reflector 12 and/or the image sensor 14 and/or the window 16 of the thermal camera 1) of radiation from the hot object 322 may cause appearance of a ghost image 324 in the thermal image 33. However, due to the small temperature difference between the hot object 322 and the thermal background assumed in this example, the ghost image 324 may be substantially invisible, or only barely visible, in the thermal image 33 (as schematically indicated by the dotted outline). This is manifested also in the frequency distribution, showing that the ghost image 324 produces a small third peak G ("ghost image peak") which is almost completely overlapped and hidden by the background peak B. For instance, the temperature of the ghost image 324 may differ from the thermal background by less than the noise equivalent temperature difference (NETD) of the image sensor. The NETD is a measure of how well the image sensor is able to distinguish between small differences in thermal radiation in the image.

Figure 3C:
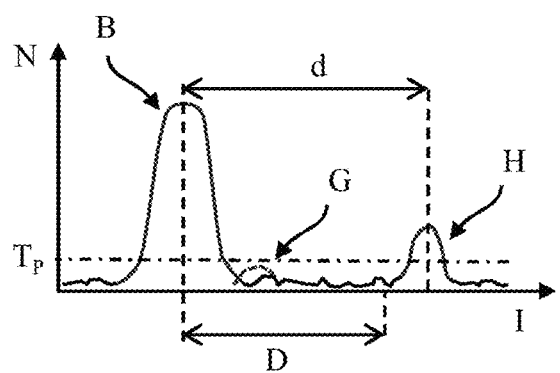

The thermal image 34 in FIG. 2c, depicts the scene when the temperature of the object 322 is further increased above the thermal background (by way of example, the hot object 322 may in this example be at least 25 K hotter than the thermal background). FIG. 3c shows an example of the corresponding frequency distribution of pixel intensities for the thermal image 34. The frequency distribution, like the frequency distribution in FIG. 3b, comprises a hot object peak H caused by the hot object 322, in addition to the background peak B. However, due to the greater temperature difference in this example, the separation d between the background peak B and the hot object peak H is greater than in FIG. 3b. The temperature difference between the hot object 322 and the thermal background assumed in this example is such that internal reflections in the thermal camera produces a strongly appearing ghost image 324 in the thermal image 34 (as schematically indicated by the dashed outline). This is manifested also in the frequency distribution, showing that the ghost image 324 produces a ghost image peak G which now is clearly discernible from the background peak B.

As shown in FIG. 2c, the ghost image 324 may for instance happen to overlap another object of interest in the thermal image 34, such as the object 323 (which belongs to thermal background). Hence, an operator viewing the thermal image 34 in FIG. 2c, or an automatic monitoring algorithm processing the thermal image 34 using an image analysis algorithm, may confuse the ghost image 324 for an elevated and possibly abnormal temperature of the thermal background and/or object 324. Depending on the particular monitoring application, this may trigger false alarms, cause issues for object tracking algorithms, or at least make the thermal image 34 harder to interpret and thus reduce the reliability of the thermal monitoring.

As may be appreciated in view of the above, the need to subject a thermal image to ghost image suppression depends on the dynamic temperature of the depicted scene. For instance, in the examples of FIGS. 2a-b and 3a-b the radiation from the scene does not cause any ghost image in the thermal image which motivates performing ghost image suppression. Only in the example of FIGS. 2c and 3c will suppression of a ghost image be motivated. The following disclosure accordingly provides example implementations of methods incorporating processing of a frequency distribution to determine whether to perform ghost image suppression or not.

Figure 4:
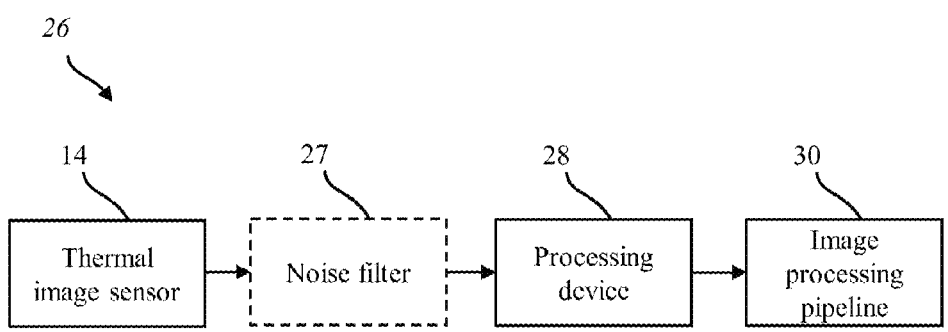
FIG. 4 shows a block diagram of an implementation of an image processing pipeline for a thermal camera.

FIG. 4 is a block diagram of an example of an image processing system 26 in which embodiments of the present invention may be implemented. The image processing system 26 comprises an image sensor 14, a processing device 28, and a downstream image processing pipeline 30. The image processing system 26 may be included in a thermal image camera, such as the thermal camera 1 of FIG. 1.

The image sensor 14 (e.g. a microbolometer sensor) acquires a thermal image with pixel intensities depending on the amount of IR radiation received from the scene monitored by the thermal camera. The thermal image output by the image sensor 14 comprises raw thermal image data including pixel intensities which have not yet been non-linearized.

The thermal image comprising the raw thermal image data is received for processing by the processing device 28, as will be set out below. The processing device 28 may forward to the downstream image processing pipeline 30 either a processed thermal image, which has been subjected to ghost image suppression by the processing device 28, or an un-processed thermal image, which has not been subjected to ghost image suppression by the processing device 28.

The downstream image processing pipeline 30 may implement a number of conventional sequential processing steps which for instance may serve to enhance and compress the thermal image data. Examples of such processing steps include noise reduction, global/local detail enhancement, sharpening etc. In particular, the image processing pipeline 30 may implement non-linearization of the raw thermal image data to produce a non-linearized thermal image better suited for viewing by a human than the pixels of the raw thermal image data.

The processing performed by the processing device 28 and the image processing pipeline 30 may be implemented in both hardware and software. In a hardware implementation, each of the method steps set out herein (e.g. the obtaining of the frequency distribution, the threshold comparison, the ghost image suppression, the non-linearization, image enhancements) may be realized in dedicated circuitry. The circuitry may be in the form of one or more integrated circuits, such as one or more application specific integrated circuits (ASICs) or one or more field-programmable gate arrays (FGPAs). In a software implementation, the circuitry may instead be in the form of a processor, such as a central processing unit or a graphical processing unit, which in association with computer code instructions stored on a (non-transitory) computer-readable medium, such as a non-volatile memory, causes the processing device 28 and/or the image processing pipeline 30 to carry out the respective processing steps. Examples of non-volatile memory include read-only memory, flash memory, ferroelectric RAM, magnetic computer storage devices, optical discs, and the like. It is to be understood that it is also possible to have a combination of a hardware and a software implementation, meaning that some method steps may be implemented in dedicated circuitry and others in software.

Implementations of the thermal image processing performed by the processing device 28, will now be described with further reference to the flow chart FIG. 5.

At step S1, the processing device 28 obtains a thermal image depicting a scene and acquired by a thermal camera, such as the thermal camera 1. The thermal image is received from the thermal image sensor 14 and comprises raw thermal image data. The pixel intensities of the raw thermal image data of a microbolometer image sensor may by way of example have a dynamic range of 14 bits or more, such as 18 bits or 21 bits.

At step S2, the processing device 28 obtains a frequency distribution based on the pixel intensities of the thermal image, more specifically of the raw thermal image data. In some implementations, the processing device 28 may compute a frequency distribution of the pixel intensities of the thermal image received from the thermal image sensor 14. In some implementations, a frequency distribution may already be provided by the thermal image sensor 14, together with the thermal image. The processing device 28 may in this case obtain the frequency distribution by receiving the frequency distribution from the thermal image sensor 14. In either case, the frequency distribution may advantageously be defined for a plurality of bins of pixel intensities, partitioning the dynamic range of the thermal image. The number and width of the intensity bins may vary depending on the computing resources of the processing device 28, and on the required precision of the frequency distribution analysis. While a binned frequency distribution may reduce the computational resources required by the method, use of a non-binned frequency distribution is not precluded.

At step S3, the processing device 28 performs processing of the frequency distribution obtained at step S2 to determine whether the frequency distribution comprises a hot object peak which is separated from a thermal background of the scene by more than an intensity threshold.

In some implementations, the processing device 28 may process the frequency distribution to detect a first peak caused by a hot object and a second peak caused by a thermal background of the scene, and determining whether a separation between the first peak and the second peak exceeds the intensity threshold.

Considering the example of FIGS. 2a and 3a, the scene comprises no hot object and the processing device 28 may detect only the background peak B in the frequency distribution. Step S3 will in this case evaluate as false. The processing device 28 may thus proceed according to the "false"-branch of FIG. 5, and accordingly at step S6 output the thermal image (comprising the raw thermal image data) without subjecting the thermal image to any ghost image suppression. The thermal image and the raw thermal image data may thus be forwarded in un-processed form to the downstream image processing pipeline 30.

Considering the example of FIGS. 2b and 3b, the scene comprises the hot object 322 and the processing device 28 may thus detect both a hot object peak H and a background peak B in the frequency distribution. However, the temperature difference between the hot object 322 and the thermal background is in this case such that the separation (indicated by d in FIG. 3b) between the peaks H and B is less than the intensity threshold (indicated by D in FIG. 3b). Hence, d<D wherein step S3 also in this case evaluates as false. The processing device 28 may thus also in this case proceed according to the "false"-branch of FIG. 5 and to step S6.

Considering the example of FIGS. 2c and 3c, the scene comprises the hot object 322 and the processing device 28 may thus detect both a hot object peak H and a background peak B in the frequency distribution. In this case, the temperature difference between the hot object 322 and the thermal background is such that the separation d between the peaks H and B exceeds the intensity threshold D in FIG. 3b. Hence, d>D wherein step S3 will evaluate as true. That is, the processing device 28 determines that the frequency distribution comprises a hot object peak H which is separated from the thermal background by more than the intensity threshold D. The processing device 28 does in this case proceed according to the "true"-branch of FIG. 5 comprising step S4.

The identification or detection of a peak in a frequency distribution may be realized by searching the frequency distribution for intensity values I (or bins) for which the frequency values N exceed a peak magnitude threshold (i.e. peak height threshold) of a predefined minimum frequency. The search may be performed from low to high intensity, or vice versa.

As a peak may span an interval of pixel intensities (especially in case of non-binned frequency distributions or frequency distributions with relatively narrow bins) the peak search may apply a further condition that the peak magnitude threshold should be exceeded over an interval of at least a predetermined number of consecutive pixel intensities (a peak width threshold) for a peak to be detected. In that way, one may avoid identifying single or few intensity value peaks as background or hot object peaks.

As the magnitude of the background peak B typically will be greater than the magnitude of the hot object peak H, the peak detection may in some implementations use two different peak magnitude thresholds for detecting the peaks B and H. For instance, a first peak magnitude threshold may be used for detecting the hot/first object peak H and a second peak magnitude threshold, greater than the first peak magnitude threshold, may be used for detecting the background/second object peak B. However, it is also possible to use a common peak magnitude threshold for detecting the background peak B and the hot object peak H. In this case, the peak magnitude threshold may be set high enough to avoid identifying small spurious peaks in the frequency distribution (e.g. caused by noise) as hot object peaks, and low enough to reliably identify peaks due to actual hot objects in the scene.

Each of the aforementioned peak magnitude thresholds and the peak width threshold may be considered as design parameters. The peak width threshold may, for instance, be set as a certain percentage of the total number of possible pixel intensities that can be represented in the thermal image (i.e. at the bit depth of the thermal image). By way of example, it may be set to 5% of the total amount of possible pixel values. As a further example, the peak width threshold may be set depending on the noise of the thermal camera or the image sensor. The peak width threshold can be set based on the NETD, such as the NETD multiplied by a scaling factor (e.g. about 2 to 4). Notably, the NETD may depend both on ambient temperature and temperature of the target (i.e., the pixel values in the image). This means that the peak width threshold may depend on the pixel values in a candidate peak region so that it takes different values for a relatively lower part of the range of possible pixel values compared to a relatively higher part of the range of possible pixel values.

Correspondingly, the peak magnitude threshold may be set depending on the pixel values represented in the thermal image (or equivalently in the frequency distribution). For instance, the peak magnitude threshold may be set depending on a highest pixel intensity frequency in the thermal image (i.e. the pixel intensity with the highest frequency/occurrence in the thermal image). For instance, the higher the highest pixel intensity in the thermal image, the higher the peak magnitude threshold (e.g. the highest pixel intensity scaled by a factor between 0 and 1). As another example the peak magnitude threshold may be set depending on the range spanned by the lowest pixel intensity and the highest pixel intensity in the thermal image. The wider the range, the lower the peak magnitude threshold. To exemplify, consider, on the one hand, a room temperature scene with a human object depicted in a thermal image. In such a scene the pixel values would range from, e.g., 18-34° C., and most pixel values within that range would likely be represented in the thermal image. On the other hand, consider a scene with cold sky, moderate outdoor temperature, human objects, and really high temperature machinery (e.g. forming a hot object). In such a scene, the pixel values could instead range from 0-200° C., but many pixel values within the range would not be represented. The former of these two scenes would require a higher peak magnitude threshold than the latter. Notably, since the peak magnitude threshold may depend on scene content, i.e., the range of pixel values represented in the thermal image, it could vary between sequentially captured thermal images during monitoring of a scene.

FIG. 3*a-c* depicts an example of a common peak magnitude threshold Tp. In the example of FIG. 3*a*, a single peak B may be detected and thus be identified as the background peak B. In each of the examples of FIGS. 3*b* and 3*c*, two peaks B and H may be detected, wherein the lower intensity peak B may be identified as the background peak and the higher intensity peak H may be identified as the hot object peak. As may be seen in FIG. 3*c*, the peak magnitude threshold Tp is set such that the ghost image peak G will not trigger the peak detection. It is envisaged that in some scenarios, also the ghost image peak G may overshoot the peak magnitude threshold Tp, resulting in detection of three peaks, the background peak B, the ghost image peak G and the hot object peak H. Therefore, the peak detection may be implemented to identify the peak at the highest intensity values as the hot object peak H. This is a reliable approach as the ghost image peak G always will be found at lower intensity values than the actual hot object peak H. An alternative approach would be to identify the peak among the two peaks G and H with the greatest magnitude as the hot object peak H. A further alternative approach would be to search for a hot object peak H in order of reducing intensity, such as from a (predefined) maximum intensity towards lower intensity. The hot object peak H may in this case be identified as the first peak located in the search. A background peak may be identified in an analogous fashion as the first peak located in a search of increasing intensity, such as from a (predefined) minimum intensity towards higher intensity.

While certainly possible, it may not be necessary to conduct the search over the full range of intensities, but the search may be confined to one or a few sub-ranges of intensities of interest. For example, the intensity of the IR radiation from the thermal background may in some environments and applications reasonably be assumed to not be below a certain value. As a non-limiting example, for a scene in an indoor environment the intensity may in typical cases be expected to correspond to a temperature of at least 15° C., wherein the search need not extend below this temperature.

Assuming the peak detection performed by the processing device 28 have identified a background peak B and a hot object peak H, the processing device 28 may determine or compute the separation d between the peaks B and H. In the examples of FIG. 3*b-c*, the separation d is determined as the separation between the respective pixel intensities with the highest frequency (i.e. occurrence or count) of each peak. This is equivalent to the intensities at the maximum magnitude (i.e. maximum height) of the background peak B and the hot object peak H.

However, the separation d may also be determined in other ways, such as the separation between a respective representative pixel intensity of the peaks B and H. The representative pixel intensities may reflect where the "middle" or "center" of the respective peaks B and H is located. For instance, the representative pixel intensity of a peak may be one of: a center of an interval defining a lowest and a highest pixel intensity of the peak, a statistical mean of the pixel intensities that falls within the peak, a mode of the peak (i.e., the most frequent pixel intensity in the peak), a median of the pixel intensities within the peak, a center of mass of the peak, or a skewed (weighted) mean of the peak.

According to yet another example, the processing device 28 need not expressly detect a background peak B but only a hot object peak H. Instead, a representative intensity for the thermal background may be estimated or derived based on the pixel intensities of the thermal image or the frequency distribution. For instance, the processing device 28 may determine a separation between the hot object peak H and an average intensity of the thermal background, determined based on pixel intensities of the thermal image. For instance, an average intensity averaged over the full range or a sub-range of pixel intensities of the thermal image (or an auxiliary thermal image of the scene acquired by the thermal camera under the same capturing conditions) or equivalently the frequency distribution (for the thermal image or the auxiliary thermal image) may be computed. The processing device 28 may in this case determine whether the frequency distribution comprises a hot object peak H which is separated from a thermal background of the scene by more than an intensity threshold D, wherein the separation may be determined as the difference between a representative pixel intensity for the hot object peak (e.g. the most frequent intensity of the hot object peak H and the representative intensity for the thermal background. It is even possible to determine a separation between the hot object peak and a predetermined representative intensity for the thermal background, based e.g. on an assumed intensity, radiance or temperature of the thermal background. While this approach may enable an even simpler and more computationally efficient implementation of the method, it is contemplated that a non-predetermined (i.e. dynamic) estimate of the intensity of the thermal background (e.g. derived from a frequency distribution using any of the aforementioned approaches) may result in a more reliable activation of the ghost image suppression.

The intensity threshold D used to determine whether to subject a thermal image to ghost image suppression may be a predetermined intensity threshold. The intensity threshold may for instance be set to correspond to a temperature difference between the hot object and the thermal background above which a strong ghost image is known or expected to appear. For instance, the intensity threshold may be set to correspond to a temperature difference of 25 K or more. A temperature difference of 25 K is well above the noise level of typical state-of-the-art thermal cameras and tends to produce a strong appearance of a ghost image. A higher predetermined threshold D is however also possible, such as corresponding to a temperature difference of 50 K or more, or 100 K or more. A higher intensity threshold D translates to a less easy triggering of the ghost image suppression.

The specific value of the intensity threshold D may in general be established in view of the characteristics of the thermal camera and/or on how easily the ghost image suppression should be triggered, conversely to what extent ghost images are tolerable in the intended application.

For instance, a full characterization of the thermal camera may be conducted (e.g. before the thermal camera is installed in the monitoring environment). The characterization may take into account parameters such as sensor noise, the reflection coefficients of the surfaces producing the internal reflections (e.g. the cover and the reflector and/or the image sensor), the reflection and transmission coefficients of the optical elements of the optical system of the thermal camera, etc. The intensity difference at which a hot object tends to cause any appreciable ghost image may thereby be established, e.g. by calculations and/or simulations. The intensity difference may also be experimentally established by analyzing thermal images acquired by the thermal camera of test scenes under various temperature conditions and for various object locations in the scene. In either case, the established intensity difference may be used directly as the intensity threshold D, or the intensity threshold D may be set based on the established intensity difference (e.g. scaled by an application-specific factor).

According to another approach, a value of the intensity threshold D may be determined by scaling a noise level estimate for the image sensor based on an f-number of the optical system of the thermal camera. The sensor noise estimate (e.g. in terms of standard deviation) and the f-number are typically readily available from the manufacturer or supplier of the thermal sensor and the thermal camera, respectively. By the scaling, a representative estimate of the noise level for the thermal camera may be obtained. The noise level estimate for the sensor may more specifically be scaled by the f-number squared. The noise level of the thermal camera may correspond to a lower bound below which the ghost image may not be distinguished from the noise in the thermal background. The noise level for the thermal camera hence represents a conservative basis for determining the intensity/ghost image suppression threshold. A noise level estimate for the image sensor may for instance be given in terms of a standard deviation, wherein the intensity threshold D may be determined by scaling the noise level estimate by the f-number squared to obtain the noise level estimate for the thermal camera in terms of a standard deviation, and thereafter scaling the standard deviation of the noise for the thermal camera by a factor (e.g. 3 wherein the threshold D corresponds to three-sigma of the noise level estimate of the thermal camera). A noise level estimate for the image sensor may also be given in terms of the NETD, which may be translated to an NETD for the thermal camera by scaling the NETD for the image sensor with the f-number squared. This may also represent a good starting point for determining a value of the intensity threshold D.

According to some implementations, the intensity threshold D need not be predetermined but may be dynamically set during operation. The processing device 28 may obtain a noise level estimate for the thermal camera, and determine the intensity threshold D based on the noise level estimate. The noise level estimate for the thermal camera may be derived from a noise threshold of a noise filter of the thermal camera. As shown in FIG. 4, a noise filter 27 may for instance be implemented in the image processing system 26, between the image sensor 14 and the processing device 28. As per se is known in the art, such a noise filter has a threshold (which may be variable in dependence on capturing mode of the thermal camera) above which a signal read-out from a pixel of the image sensor 14 is considered to be real and not noise. The processing device 28 may accordingly derive a noise level estimate for the thermal camera by obtaining (e.g. reading) the noise threshold from the noise filter 27. Thermal cameras may have both a temporal noise filter (with a threshold set based on a sequence of acquired thermal images or frames) and a spatial noise filter (with a threshold set based on a single current thermal image), which collectively may define a spatio-temporal noise filter 27. The processing device 28 may in this case derive a noise level estimate for the camera based on the temporal and spatial noise thresholds of the spatio-temporal noise filter 27. Alternatively, a noise level estimate for the thermal camera may be obtained by estimating a noise level based on a set of auxiliary thermal images of the scene acquired by the thermal camera, captured prior to capturing the thermal image which is to be processed and possibly subjected to the ghost image suppression by the processing device 28. In either case, the intensity threshold D may then be determined using the obtained noise level estimate. The noise level estimate may for instance be scaled by a predefined factor whose value is based on a priori knowledge of how the noise level estimate impacts the sensitivity to ghost images. The intensity threshold D may alternatively be determined using the obtained noise level estimate and an estimated average pixel intensity for the scene. The average pixel intensity may be estimated by the processing device 28. For instance, an average pixel intensity averaged over the full range or a sub-range of pixel intensities of the thermal image (or an auxiliary thermal image of the scene acquired by the thermal camera under the same capturing conditions) or equivalently the frequency distribution (for the thermal image or the auxiliary thermal image) may be computed. For example, the processing device 28 may determine the intensity threshold D as a ratio of the noise level estimate (e.g. the noise threshold) and the average pixel intensity (equivalent to 1/SNR) times a scaling factor. The relevance of this approach may be better understood considering that 1/SNR is substantially proportional to the NETD.

Figure 5:
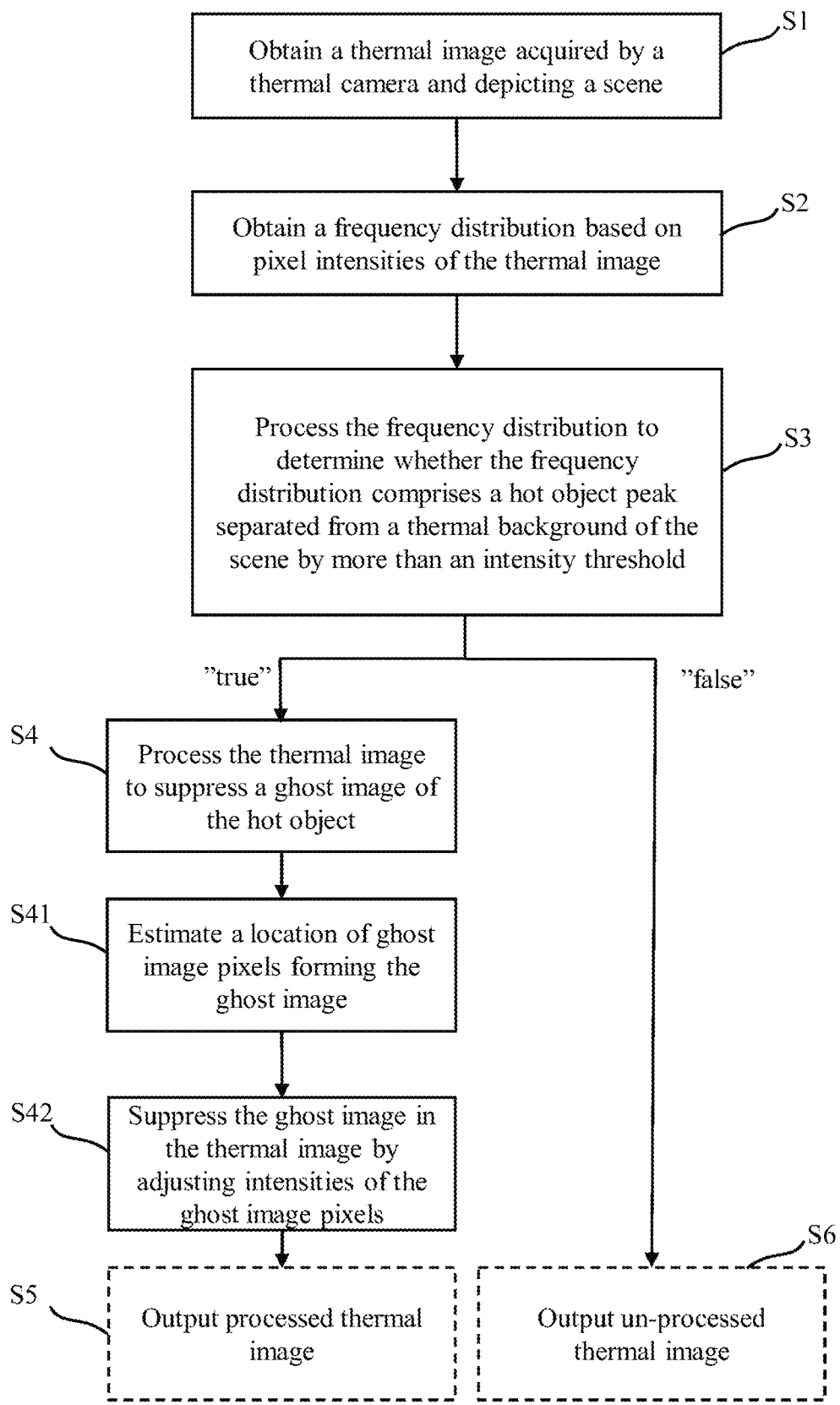
FIG. 5 is a flow chart of a method for suppressing a ghost image of a hot object in a thermal image.

With reference again to the flow chart of FIG. 5, if at step S3, it is determined that d>D, the method proceeds to the "true"-branch, wherein the processing device 28, at step S4, performs processing of the thermal image to suppress a ghost image of the hot object in the thermal image. In other words, if d>D, the processing device 28 subjects the thermal image to ghost image suppression. The processing of the ghost image suppression comprises sub-step S41 wherein the processing device 28 estimates a location of ghost image pixels forming the ghost image, and sub-step S42 wherein the processing device 28 suppressing the ghost image in the thermal image by adjusting intensities of the ghost image pixels. After processing the thermal image to suppress the ghost image, the method may proceed by, at step S5, outputting a processed thermal image to the downstream image processing pipeline 30.

Various implementations of sub-steps S41 and S42 are possible. In some implementations, a "static" approach may be employed wherein the location of the ghost image pixels may be estimated based on a priori knowledge of a scene location where a hot object may appear and a location in the thermal image where the ghost image will appear upon appearance of the hot object at the scene location. This approach may for instance be useful when thermally monitoring a scene comprising a single stationary object of interest. Non-limiting examples include a scene comprising a single known heat-generating component in a transformer station, a machine prone to over-heating in a factory, a flammable product in a monitored space of a building. In another static approach, suitable when monitoring a scene comprising a number of stationary objects with distinct sizes and/or distinct IR radiation signatures, a respective predetermined mapping may be established between the magnitude, the position, and/or shape of the respective hot object peak caused by each object when hot, and a respective location in the thermal image where the ghost image will appear upon appearance of the respective hot object. Thus, a first hot object peak corresponding to a first hot object may be mapped to a first set of ghost image pixels in the thermal image, a second hot object peak corresponding to a second hot object may be mapped to a second set of ghost image pixels in the thermal image, etc.

In both of these above-mentioned static approaches, the processing device 28 may at sub-step S42 adjust the intensities of the ghost image pixels based on a representative pixel intensity of the (corresponding) hot object. The processing device 28 may for instance adjust the intensity of each ghost image pixels by subtracting a fraction of the representative intensity of the hot object. The representative pixel intensity of the hot object may for example be the same as the representative pixel intensity of the hot object peak H, as set out above in connection with FIG. 3a-c. The fraction may be a predetermined value between 0 and 1 based on the known reflection coefficients of the surfaces producing the internal reflections.

In many instances it may not be convenient or even possible to establish any predetermined mappings between an appearing hot object or hot object peak, and the location of the ghost image pixels. For instance, the location of objects of interest may not be known a priori. Moreover, the magnitude, position and/or shape of hot object peaks corresponding to different objects may be unknown or indistinguishable. Therefore, with reference to FIG. 6 an implementation of sub-steps S41 and S41 allowing ghost image suppression in a thermal image depicting a scene comprising an arbitrary and possibly non-stationary configuration of objects of interest.

Figure 6:
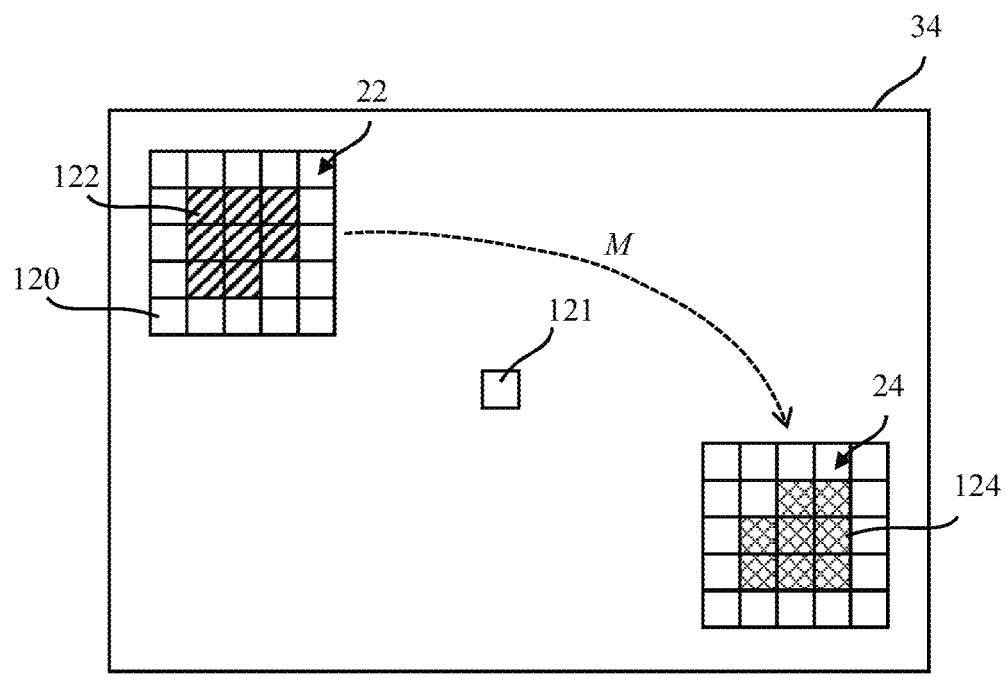
FIG. 6 depicts an approach for estimating a location of ghost image pixels.

With reference to FIG. 6 (representing thermal image 34 where some of the pixels 120, 121, 122, 124 are individually shown), if, at step S3, it has been determined that the frequency distribution comprises a hot object peak H separated from the thermal background (e.g. a background peak B) by an amount d exceeding the intensity threshold D, the processing device 28 proceeds by estimating a location of hot object pixels 122 (pixels with diagonal fill pattern) depicting the hot object in the thermal image 34. The hot object pixels 122 may be located by identifying pixels in the thermal image 34 corresponding to the hot object peak H. That is, the hot object pixels may be assumed to be pixels in the thermal image 34 contributing to the hot object peak.

One approach for identifying the hot object pixels in the thermal image 34 is to perform a scan (row- or column-based) through the pixels of the thermal image 34 and identify each pixel with an intensity falling withing the hot object peak H as a hot object pixel 122. Another approach for identifying the hot object pixels in the thermal image 34 is to define a hot object pixel threshold with a value set to a minimum intensity of the hot object peak H. A scan may then be performed through the pixels of the thermal image 34 wherein each pixel with an intensity meeting or exceeding the hot object pixel threshold may be identified as a hot object pixel 122. This merely represents two possible example approaches and any other approach allowing a correspondence to be found between the hot object peak H and the pixels contributing to the hot object peak H may be used.

To avoid identifying hot object pixels from single pixels or small clusters corresponding to hot objects too small to cause any disturbing ghost images, or originating from spurious pixel readings, or stuck saturated pixels at random positions in the sensor array, the processing device 28 may implement spatial filtering in the hot object pixel identification. The processing device 28 may thus impose the condition that the hot object pixels are pixels in the thermal image belonging to a contiguous set of least a threshold number of pixels, in addition to corresponding to the hot object peak H.

In FIG. 6, a contiguous set of hot object pixels 122 forming a hot object image 22 depicting the hot object, has been identified. The hot object pixels 122 of the hot object image 22 is surrounded by non-hot object pixels 120 (i.e. pixels not identified as corresponding to the hot object peak H). The location (i.e. pixel coordinates) of the hot object pixels 122 has thus been estimated.

Having estimated the location of the hot object pixels 122 (i.e. the pixel coordinates of the hot object pixels 122), the location (i.e. pixel coordinates) where the corresponding ghost image pixels 124 of the thermal image 34 are expected to appear may be estimated. In FIG. 6, the (estimated) ghost image pixels 124 are indicated with a diamond fill pattern. The set of ghost image pixels 124 form the ghost image 24.

The processing device 28 may estimate the location (pixel coordinates) of the ghost image pixels 124 using a predefined transform M mapping the estimated location (x', y') of the hot object pixels 122 to an estimated location (x, y) of the ghost image pixels 124. In mathematical terms, M: (x', y')→(x, y).

The transform M may reflect the imaging properties of the optical system of the thermal camera. For instance, experiments may be performed where hot objects are introduced at various locations of a test scene and a spatial relationship between the resulting hot object pixels and ghost image pixels is established and captured in a transform M. A transform M may also be determined by a numerical approach. For instance, since all optical path lengths within the thermal camera, the material surface reflection and optical refraction are known, as well as the distances between the optical components, the reflected ghost image pixels can be found from the location of the hot object pixels by ray tracing.

As discussed above, reflections from the thermal image sensor itself may be a major contributor to a ghost image and tend to result in a ghost image in the form of a well-focused inverted reduced intensity-image of the hot object. By defining the mapping of the predetermined transform M such that the ghost image pixels 124 correspond to point reflections of the hot object pixels 122 relative a center pixel 121 of the thermal image 34, a reliable estimate of the location of the ghost image pixels 124 may be obtained. The predetermined transform M may thus map the pixel coordinate of each hot object pixel 122 to a pixel coordinate of a corresponding ghost image pixel 124. A spatial correspondence between each hot object pixel 122 and a respective ghost image pixel 124 may thus be established. The transform M may define a bijective mapping M: (x', y')→(x, y) between hot object pixel coordinates (x', y') and ghost image pixel coordinates (x, y). That is, a one-to-one correspondence may be established between the hot object pixels 122 and the ghost image pixels 124. While in FIG. 6, the point reflection of the transform M is made with respect to the center pixel 121, other references for the reflection are possible. For instance, the internal reflections may result in a ghost image corresponding to a center-shifted (offset) inversion of the hot object image. In this case, the transform M may define a point reflection with respect to an off-center pixel of the thermal image 34.

Having estimated the location of the ghost image pixels 124, the processing device 28 may (e.g. at step S42 of FIG. 5) proceed to suppress the ghost image 24 in the thermal image 34 by adjusting the intensity of the ghost image pixels 124. The intensity of the ghost image pixels 124 may be adjusted by subtracting a fraction of a hot object pixel intensity. In general, the hot object pixel intensity may be an intensity falling within the hot object peak H. A hot object pixel intensity may be determined in various manners, as will be set out in the following. Like the frequency distribution, the ghost image suppression may advantageously be based on the raw thermal image data pixel intensities.

According to one approach, a fraction r of a representative hot object pixel intensity $I_h$ may be subtracted from each ghost image pixel. The adjusted intensity $I_g^a$ of a ghost image pixel 124 at a pixel coordinate (x, y) with original intensity $I_g$ may thus be determined as:

$$I_g^a(x, y) = I_g(x, y) - I_h * r \qquad \text{(Eq. 1)}$$

The intensity of each ghost image pixel may thus be attenuated by a same amount. Thereby, the pixel intensities of the ghost image pixels 124 may in a sense be "restored" to intensities closer to the intensities the pixels would have, had no hot object been present in the scene. The representative hot object pixel intensity $I_h$ may for example be the same as the representative pixel intensity of the hot object peak H, determined as set out above in connection with FIG. 3a-c. The fraction r may be a predetermined value between 0 and 1 based on the known reflection coefficients of the surfaces producing the internal reflections.

As mentioned above, if the transform provides a bijective mapping M: (x', y')→(x, y), a one-to-one spatial correspondence between the hot object pixels 122 and the ghost image pixels 124 may be established. Thus, instead of attenuating each ghost image pixel by a same amount (i.e. $I_h*r$), the adjusted intensity $I_g^a$ of a ghost image pixel 124 at a pixel coordinate (x, y) with original intensity $I_g$ may be determined as:

$$I_g^a(x, y) = I_g(x, y) - I_h(x', y') * r \qquad \text{(Eq. 2)}$$

This approach may provide a more precise ghost image suppression, since each ghost image pixel 124 may be attenuated based on the intensity of its one-to-one corresponding hot object pixel 122. The amount of attenuation applied to each ghost image pixel 124 may hence better reflect the actual amount of additional intensity added to the ghost image pixel 124 due to the internal reflections of the radiation from the hot object.

According to a further example, a variable intensity attenuation of the ghost image pixels 124 may also be provided for transforms M providing a non-bijective mapping from (x', y') to (x, y). For instance, a non-bijective mapping may map two or more hot object pixel coordinates (x', y') to a same ghost image pixel coordinate (x, y) (e.g. implying that the imaging properties of the optical system of the thermal camera are such that the ghost image is diminished and/or distorted relative the hot object image). The transform hence still establishes a spatial correspondence between the hot object pixels 122 and the ghost image pixels 124, however the spatial correspondence is not a one-to-one correspondence but a many-to-one correspondence. In this case, the intensity of each ghost image pixel may be attenuated by a fraction of a respective representative hot object pixel intensity, wherein the representative hot object pixel intensity is based on the pixel intensities of the two or more spatially corresponding hot object pixels. The representative hot object pixel intensity may for instance be a function of the pixel intensities of the two or more spatially corresponding hot object pixels, such as an average, a median, a minimum or a maximum intensity thereof.

A further example of a variable intensity attenuation of the ghost image pixels 124 is based on Eq. 1 and a (single) representative hot object pixel intensity, but where the fraction is a function of the location of the ghost image pixel, i.e.

$$I_g^a(x, y) = I_g(x, y) - I_h * r(x, y) \quad \text{(Eq. 3)}$$

For instance, r(x, y) may decrease as a function of distance from a center of mass of the ghost image pixels 124.

Figure 7:
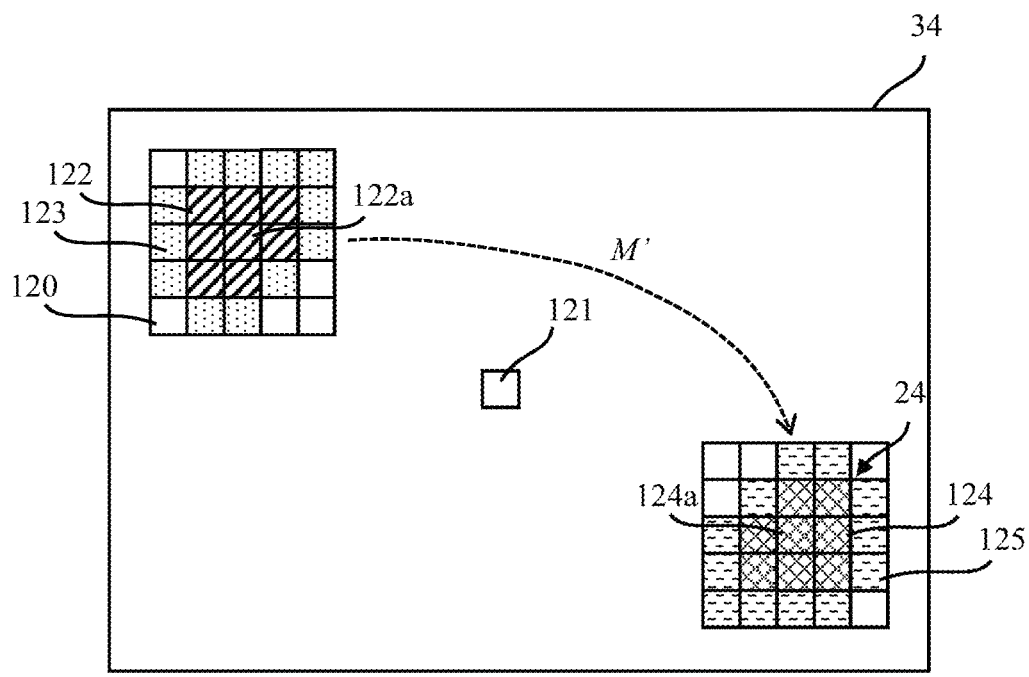
FIG. 7 depicts a further approach for estimating a location of ghost image pixels.

FIG. 7 illustrates a further approach for estimating a location of the hot object pixels 122 and the ghost image pixels 124. After having identified the hot object pixels 122 (e.g. as described in connection with FIG. 6), the processing device 28 may proceed to determine pixel coordinates of an enclosure for the hot object pixels 122. In FIG. 7, the pixels of the enclosure are denoted 123 and highlighted with a dot pattern. This allows the pixel coordinates of the enclosure 123 (rather than the set of pixel coordinates of the individual hot object pixels 122) to be used as an estimate of the location of the hot object pixels 122. The pixel coordinates of the enclosure 123 may be represented as absolute pixel coordinates. The pixel coordinates of the enclosure 123 may also be represented as relative pixel coordinates relative a single representative pixel coordinate for the hot object pixels 122. The representative pixel coordinate may for instance be a pixel coordinate of a selected pixel of the enclosure 123. Another convenient choice would be a pixel coordinate for a center-of-mass of the hot object pixels 122. The estimated location of the hot object pixels 122 may in these cases be represented by the relative pixel coordinates of the enclosure 123 and the representative pixel coordinate. In FIG. 7, reference sign 122a represents an example of a pixel at the representative pixel coordinate.

Having estimated the location of the hot object pixels 122 (e.g. the pixel coordinates of the enclosure 123), the location (i.e. pixel coordinates) where the corresponding ghost image pixels 124 of the thermal image 34 are expected to appear may be estimated. The processing device 28 may estimate the location of the ghost image pixels 124 by mapping the pixel coordinates of the enclosure 123 to corresponding pixel coordinates for an enclosure for the ghost image pixels 124 using a predefined transform M'. The transform M' may in analogy with the transform M provide a mapping M': (x', y')→(x, y), where (x', y') denotes the pixel coordinates of the enclosure 123 and (x, y) denotes the pixel coordinates of the enclosure of the ghost image pixels 124. In FIG. 7, the pixels of the enclosure of the ghost image pixels 124 are denoted 125 and highlighted with a horizontally striped pattern.

If the enclosure 123 is defined by absolute pixel coordinates, the transform may perform a direct mapping of the absolute pixel coordinates (x', y') of the enclosure 123 to absolute pixel coordinates (x, y) of the enclosure 125. For example, the transform M' may perform a point reflection of the pixel coordinates (x', y') of the enclosure 123 (e.g. with respect to the center pixel 121).

If the enclosure 123 is defined by relative pixel coordinates, the transform may comprise a first mapping of the representative pixel coordinate for the hot object pixels 122 (e.g. the coordinate of pixel 122a) to a corresponding representative pixel coordinate for the ghost image pixels 124 (e.g. the coordinate of pixel 124a), and thereafter a second mapping to find the pixel coordinates (x, y) of the enclosure 125 from the representative pixel coordinate for the ghost image pixels 124 and the relative pixel coordinates of the enclosure 123. For example, the relative pixel coordinates (x, y) of the enclosure 125 may be determined by inverting the relative pixel coordinates (x', y') of the enclosure 123 and then adding the inverted relative pixel coordinates (x, y) to the representative pixel coordinate for the ghost image pixels 124 (e.g. the pixel coordinate of pixel 124a).

Once the enclosure 125 has been determined, the ghost image pixels 124 may be identified as the pixels located within the enclosure 125. The processing device 28 may thereafter (e.g. at step S42 of FIG. 5) proceed by suppressing the ghost image 24 in the thermal image 34 by adjusting the intensity of the ghost image pixels 124, for instance using the approach of Eq. 1. In case the transform M' results in an enclosure 125 congruent to the enclosure 123, also Eq. 2 may be applied by a simple coordinate transform between the coordinates of the hot object pixels 122 and the coordinates of the ghost image pixels 124. If the transform M' is shape-preserving but not necessarily congruent, Eq. 3 may be used to adjust the intensity of the ghost image pixels 124. Either Eq. 1 and. 4 may be used even if there is no simple spatial correspondence between the hot object pixels 122 within the enclosure 123 and the ghost image pixels 124 within the enclosure 125.

An advantage of the approach in FIG. 7, is that for hot object images 22 comprising a greater number of pixels 122 than its corresponding enclosure 123, applying the transform to the enclosure M' (and optionally a representative pixel coordinate) may allow estimation of the location of the ghost image 24 using fewer computations than applying a corresponding transform to each of the enclosed hot object pixels.

The person skilled in the art realizes that the present invention by no means is limited to the preferred embodiments described above. On the contrary, many modifications and variations are possible within the scope of the appended claims. For example, while the above discussion has tacitly assumed camera installations with a fixed field of view, the methods and approaches disclosed herein may also be used in a dynamic installation wherein the zoom, pan and/or tilt of the thermal camera may be varied to allow scanning within a larger scene in an environment. In this case, the method for suppressing a ghost image as set out in the above may be applied to a sequence of thermal images acquired by the thermal camera over the course of a scan across the scene. Thereby, the conditional ghost image suppression described in the above may be applied selectively to thermal images of the sequence.

The invention claimed is:

1. A method for thermal image processing, the method comprising:
    obtaining a thermal image acquired by a thermal camera and depicting a scene;
    obtaining a frequency distribution based on pixel intensities of the thermal image;
    processing the frequency distribution to determine whether the frequency distribution comprises a peak, caused by a hot object in the scene, which is separated from a thermal background of the scene by more than an intensity threshold; and in response to determining that the frequency distribution comprises the peak which is separated from the thermal background by more than the intensity threshold, processing the thermal image to suppress a ghost image of the hot object in the thermal image, wherein the ghost image is caused by internal reflections of radiation from the hot object in the thermal camera, and wherein the processing of the thermal image comprises:

estimating a location of ghost image pixels forming the ghost image; and suppressing the ghost image in the thermal image by adjusting intensities of the ghost image pixels.

2. The method according to claim 1, wherein processing the frequency distribution comprises:

detecting in the frequency distribution the peak caused by the hot object and a further peak caused by a thermal background of the scene, and determining whether a separation between the peak and the further peak exceeds the intensity threshold.

3. The method according to claim 1, wherein the thermal image comprises raw thermal image data and the frequency distribution is a frequency distribution of pixel intensities of the raw thermal image data.

4. The method according to claim 1, further comprising:
obtaining a noise level estimate for the thermal camera; and determining the intensity threshold based on the noise level estimate, wherein the noise level estimate for the thermal camera is derived from a noise threshold of a noise filter of the thermal camera or estimated based on a set of auxiliary thermal images of the scene acquired by the thermal camera.

5. The method according to claim 1, wherein the intensity threshold is predetermined.

6. The method according to claim 1, further comprising estimating a location of hot object pixels depicting the hot object in the thermal image to generate the estimated location by identifying pixels in the thermal image corresponding to the peak in the frequency distribution caused by the hot object;

wherein the location of the ghost image pixels in the thermal image is estimated based on the estimated location of the hot object pixels.

7. The method according to claim 6, wherein the hot object pixels are pixels in the thermal image belonging to a contiguous set of least a threshold number of pixels and having an intensity falling within the peak in the frequency distribution caused by the hot object.

8. The method according to claim 6, wherein the location of the ghost image pixels is estimated using a predefined transform mapping the location of the hot object pixels to an estimated location of the ghost image pixels.

9. The method according to claim 8, wherein the mapping is such that the ghost image pixels correspond to point reflections of the hot object pixels.

10. The method according to claim 9, wherein estimating the location of the hot object pixels comprises determining a pixel coordinate of each hot object pixel, and wherein estimating the location of the ghost image pixels comprises mapping the pixel coordinate of each hot object pixel to a pixel coordinate of a corresponding ghost image pixel using the predefined transform.

11. The method according to claim 7, wherein estimating the location of the hot object pixels comprises determining pixel coordinates of an enclosure for the hot object pixels, and wherein estimating the location of the ghost image pixels comprises mapping the pixel coordinates of the enclosure for the hot object pixels to corresponding pixel coordinates for an enclosure for the ghost image pixels using the predefined transform, wherein the ghost image pixels are the pixels located within the enclosure for the ghost image pixels.

12. The method according to claim 1, wherein suppressing the ghost image in the thermal image comprises adjusting the intensity of the ghost image pixels by subtracting a fraction of a hot object pixel intensity.

13. A method for thermal imaging, comprising:
acquiring by a thermal camera a thermal image of a scene; and processing the thermal image using a method comprising:
obtaining a thermal image acquired by a thermal camera and depicting a scene;

obtaining a frequency distribution based on pixel intensities of the thermal image;

processing the frequency distribution to determine whether the frequency distribution comprises a peak, caused by a hot object in the scene, which is separated from a thermal background of the scene by more than an intensity threshold; and in response to determining that the frequency distribution comprises the peak which is separated from the thermal background by more than the intensity threshold, processing the thermal image to suppress a ghost image of the hot object in the thermal image, wherein the ghost image is caused by internal reflections of radiation from the hot object in the thermal camera, and wherein the processing of the thermal image comprises:

estimating a location of ghost image pixels forming the ghost image; and suppressing the ghost image in the thermal image by adjusting intensities of the ghost image pixels.

14. A non-transitory computer readable medium storing thereon a computer program, which when executed by a computer, performs a method comprising:

obtaining a thermal image acquired by a thermal camera and depicting a scene;

obtaining a frequency distribution based on pixel intensities of the thermal image;

processing the frequency distribution to determine whether the frequency distribution comprises a peak, caused by a hot object in the scene, which is separated from a thermal background of the scene by more than an intensity threshold; and in response to determining that the frequency distribution comprises the peak which is separated from the thermal background by more than the intensity threshold, processing the thermal image to suppress a ghost image of the hot object in the thermal image, wherein the ghost image is caused by internal reflections of radiation from the hot object in the thermal camera, and wherein the processing of the thermal image comprises:

estimating a location of ghost image pixels forming the ghost image; and suppressing the ghost image in the thermal image by adjusting intensities of the ghost image pixels.

15. The method according to claim 13, wherein processing the frequency distribution comprises:
  detecting in the frequency distribution the peak caused by the hot object and a further peak caused by a thermal background of the scene, and determining whether a separation between the peak and the further peak exceeds the intensity threshold.

16. The method according to claim 13, wherein the thermal image comprises raw thermal image data and the frequency distribution is a frequency distribution of pixel intensities of the raw thermal image data.

17. The method according to claim 13, further comprising:
  obtaining a noise level estimate for the thermal camera; and
  determining the intensity threshold based on the noise level estimate,
  wherein the noise level estimate for the thermal camera is derived from a noise threshold of a noise filter of the thermal camera or estimated based on a set of auxiliary thermal images of the scene acquired by the thermal camera.

18. The method according to claim 13, wherein the intensity threshold is predetermined.

19. The method according to claim 13, further comprising estimating a location of hot object pixels depicting the hot object in the thermal image by identifying pixels in the thermal image corresponding to the peak in the frequency distribution caused by the hot object;
  wherein the location of the ghost image pixels in the thermal image is estimated based on the estimated location of the hot object pixels.

20. The method according to claim 14, wherein processing the frequency distribution comprises:
  detecting in the frequency distribution the peak caused by the hot object and a further peak caused by a thermal background of the scene, and determining whether a separation between the peak and the further peak exceeds the intensity threshold.

* * * * *